United States Patent
Koh et al.

(10) Patent No.: US 9,627,714 B2
(45) Date of Patent: Apr. 18, 2017

(54) NON-AQUEOUS ELECTROLYTE AND BATTERY

(71) Applicant: DAIKIN INDUSTRIES, LTD., Osaka-shi, Osaka (JP)

(72) Inventors: Meiten Koh, Settsu (JP); Aoi Nakazono, Settsu (JP); Mayuko Taeda, Settsu (JP); Akiyoshi Yamauchi, Decatur, AL (US)

(73) Assignee: DAIKIN INDUSTRIES, LTD., Osaka (JP)

( * ) Notice: Subject to any disclaimer, the term of this patent is extended or adjusted under 35 U.S.C. 154(b) by 280 days.

(21) Appl. No.: 14/349,538

(22) PCT Filed: Oct. 3, 2012

(86) PCT No.: PCT/JP2012/075726
§ 371 (c)(1),
(2) Date: Apr. 3, 2014

(87) PCT Pub. No.: WO2013/051634
PCT Pub. Date: Apr. 11, 2013

(65) Prior Publication Data
US 2015/0004501 A1    Jan. 1, 2015

(30) Foreign Application Priority Data

Oct. 4, 2011    (JP) .................. 2011-220387

(51) Int. Cl.
| | | |
|---|---|---|
| *H01M 10/0567* | (2010.01) | |
| *H01M 4/505* | (2010.01) | |
| *H01M 4/525* | (2010.01) | |
| *H01M 10/052* | (2010.01) | |
| *H01M 10/0569* | (2010.01) | |
| *H01M 4/58* | (2010.01) | |
| *H01M 4/485* | (2010.01) | |
| *H01M 4/02* | (2006.01) | |

(52) U.S. Cl.
CPC ....... *H01M 10/0567* (2013.01); *H01M 4/485* (2013.01); *H01M 4/505* (2013.01); *H01M 4/525* (2013.01); *H01M 4/5825* (2013.01); *H01M 10/052* (2013.01); *H01M 10/0569* (2013.01); *H01M 2004/028* (2013.01); *H01M 2300/0025* (2013.01); *H01M 2300/0034* (2013.01); *Y02E 60/122* (2013.01); *Y02T 10/7011* (2013.01)

(58) Field of Classification Search
CPC ......... H01M 10/0567; H01M 10/0569; H01M 10/052; H01M 4/505; H01M 4/525; H01M 4/5825; H01M 4/485; H01M 2004/028; H01M 2300/0034; H01M 2300/0025; Y02E 60/122
See application file for complete search history.

(56) References Cited

U.S. PATENT DOCUMENTS

| | | |
|---|---|---|
| 2002/0197537 A1 | 12/2002 | Kim et al. |
| 2007/0224514 A1 | 9/2007 | Kotato et al. |
| 2008/0138714 A1 | 6/2008 | Ihara et al. |
| 2008/0241660 A1 | 10/2008 | Ogawa et al. |
| 2009/0053612 A1 | 2/2009 | Ihara et al. |

FOREIGN PATENT DOCUMENTS

| | | |
|---|---|---|
| JP | 2000-021412 A | 1/2000 |
| JP | 2002-359001 A | 12/2002 |
| JP | 2006-049112 A | 2/2006 |
| JP | 2006-049152 A | 2/2006 |
| JP | 2008-146983 A | 6/2008 |
| JP | 2008-243482 A | 10/2008 |
| JP | 2009-054288 A | 3/2009 |
| KR | 2002-0042224 A | 6/2002 |
| KR | 10-2004-0037054 A | 5/2004 |

OTHER PUBLICATIONS

International Preliminary Report on Patentability for PCT/JP2012/075726 issued Apr. 8, 2014.
Communication dated Apr. 8, 2015 from the European Patent Office in counterpart application No. 12838176.1.

*Primary Examiner* — Laura Weiner
(74) *Attorney, Agent, or Firm* — Sughrue Mion, PLLC (57) ABSTRACT

A non-aqueous electrolyte including (i) a compound represented by the general formula (1):

$$X-R-SO_2F \quad (1)$$

where R is a $C_{1-12}$ linear or branched alkylene group optionally containing an ether bond and optionally hydrogen atoms of the alkylene group are partly substituted by a fluorine atom(s); and X is a carboxylic acid derivative group), (ii) a non-aqueous solvent and (iii) an electrolyte salt.

7 Claims, 1 Drawing Sheet

NON-AQUEOUS ELECTROLYTE AND BATTERY

This application is a National Stage of International Application No. PCT/JP2012/075726, filed Oct. 3, 2012, claiming priority from Japanese Patent Application No. 2011-220387, filed Oct. 4, 2011, the contents of which are incorporated herein by reference in their entirety.

TECHNICAL FIELD

The present invention relates to a non-aqueous electrolyte suitable for batteries which can be suitably used in a field where durability at high temperature and high voltage is required, and to a battery including the non-aqueous electrolyte.

BACKGROUND ART

Development of lithium ion secondary batteries having high energy density is moving forward along with recent reduction in size and weight of electric appliances. It is also required to improve battery properties along with expansion of the area where lithium ion secondary batteries are applied.

For example, Patent Literature 1 which aims to provide a lithium secondary battery having excellent battery chemistry properties discloses an electrolyte for lithium secondary batteries containing benzenesulphonyl fluoride or p-toluenesulphonyl fluoride.

Patent Literature 2 which aims to provide a non-aqueous electrolyte secondary battery having high battery properties and being safe even at high temperature discloses a secondary battery including a non-aqueous electrolyte containing a compound reactive with an alcohol such as acetyl chloride or ethanoyl chloride.

Patent Literature 3 and 4 which seek an additive for suppressing gas generation and improving continuous charge characteristics and storage characteristics at high temperature disclose an electrolyte containing, as an additive, methanesulphonyl fluoride or $(SO_2F)-C_3H_6-(SO_2F)$.

Patent Literature 5 discloses an electrolyte which aims to improve storage characteristics and cycle characteristics and contains a sulphone compound represented by $CH_3OCOCF_2CF_2SO_2F$ and ethylene carbonate and diethyl carbonate as solvents.

CITATION LIST

Patent Literature

Patent Literature 1: JP-A 2002-359001
Patent Literature 2: JP-A 2000-21412
Patent Literature 3: JP-A 2006-49152
Patent Literature 4: JP-A 2006-49112
Patent Literature 5: JP-A 2008-146983

SUMMARY OF INVENTION

Technical Problem

However, batteries for electric vehicles and hybrid electric vehicles are required to have further excellent durability at high temperature and high voltage, and thus conventional batteries have not been considered to always have sufficient performances.

It is an object of the present invention to provide a non-aqueous electrolyte that can provide a battery having excellent durability at high temperature and high voltage.

Solution to Problem

The present inventors have carried out various studies in order to achieve the above object and as a result have found out that using a non-aqueous electrolyte containing a specific compound and a specific fluorine solvent can provide a battery having excellent durability at high temperature and high voltage to complete the present invention.

Thus the present invention is a non-aqueous electrolyte including (i) a compound represented by the general formula (1):

$$X-R-SO_2F \qquad (1)$$

(where R is a $C_{1-12}$ linear or branched alkylene group optionally containing an ether bond and optionally hydrogen atoms of the alkylene group are partly substituted by a fluorine atom(s); and X is a carboxylic acid derivative group), (ii) a non-aqueous solvent and (iii) an electrolyte salt.

The present invention is also a battery including a positive electrode, a negative electrode and the non-aqueous electrolyte.

Advantageous Effects of Invention

The non-aqueous electrolyte of the present invention has the above configurations and thus can provide a battery having excellent durability at high temperature and high voltage. The battery of the present invention includes the non-aqueous electrolyte and thus has excellent durability at high temperature and high voltage.

DESCRIPTION OF EMBODIMENTS

The non-aqueous electrolyte of the present invention includes (i) a compound represented by the general formula (1):

$$X-R-SO_2F \qquad (1)$$

wherein R is a $C_{1-12}$ linear or branched alkylene group optionally containing an ether bond and optionally hydrogen atoms of the alkylene group are partly substituted by a fluorine atom(s); and X is a carboxylic acid derivative group, (ii) a non-aqueous solvent and (iii) an electrolyte salt.

Electrolytes containing compounds having $-SO_2F$ groups have been conventionally known. However, merely having $-SO_2F$ group could not provide sufficient durability at high temperature such as capacity maintenance ratio and recovery rate at high temperature or sufficient durability at high voltage.

The non-aqueous electrolyte of the present invention contains the compound (i) having both $-SO_2F$ group and a carboxylic acid derivative group, and thus provides a battery having excellent durability at high temperature and high voltage. The battery can be used at, for example, a high temperature such as 45° C. or more and exhibits preferable cycle characteristics at a high temperature such as 60° C. or more. The battery can also be used at a high temperature such as 85° C. or more.

In view of further improving durability at high temperature and high voltage, in the general formula (1), R is preferably a $C_{1-12}$ fluorine-containing alkylene group optionally containing an ether bond. R is more preferably a $C_{1-8}$ perfluoroalkyl group optionally containing an ether bond. The term "ether bond" as used herein refers to the bond represented by —O—.

Specifically R is preferably:
—CF$_2$—,
—CF$_2$CF$_2$—,
—CF(CF$_3$)—O—CF$_2$CF$_2$—,
—CF$_2$O—CF$_2$CF$_2$—,
—CF$_2$OCF(CF$_3$)CF$_2$O—CF$_2$CF$_2$— or
—CFHCF$_2$O—CF(CF$_3$CF$_2$O—CF(CF$_3$))—.

More preferably, R is:
—CF$_2$—,
—CF$_2$CF$_2$—,
—CF$_2$O—CF$_2$CF$_2$— or
—CF$_2$OCF(CF$_3$)CF$_2$O—CF$_2$CF$_2$—.

Because X is a carboxylic acid derivative group, excellent durability at high temperature and high voltage can be obtained. In view of further improving durability at high temperature and high voltage, X is preferably —CONH$_2$, —CN, —CON(CH$_3$)$_2$ or —CON(C$_2$H$_5$)$_2$.

The compound (i) may specifically include:
—CN—CF$_2$—SO$_2$F,
—CN—CF$_2$CF$_2$—SO$_2$F,
—CN—CF(CF$_3$)OCF$_2$CF$_2$SO$_2$F,
CN—CF$_2$—O—CF$_2$CF$_2$—SO$_2$F,
CN—CF$_2$—O—CF(CF$_3$)CF$_2$O—CF$_2$CF$_2$—SO$_2$F,
NH$_2$CO—CF$_2$—SO$_2$F,
NH$_2$CO—CF$_2$CF$_2$—SO$_2$F,
NH$_2$CO—CF(CF$_3$)OCF$_2$CF$_2$SO$_2$F,
NH$_2$CO—CF$_2$—O—CF$_2$CF$_2$—SO$_2$F,
NH$_2$CO—CF$_2$—O—CF(CF$_3$)CF$_2$O—CF$_2$CF$_2$—SO$_2$F,
(CH$_3$)$_2$NCO—CF$_2$—SO$_2$F,
(CH$_3$)$_2$NCO—CF$_2$CF$_2$—SO$_2$F,
(CH$_3$)$_2$NCO—CF(CF$_3$)OCF$_2$CF$_2$SO$_2$F,
(CH$_3$)$_2$NCO—CF$_2$—O—CF$_2$CF$_2$—SO$_2$F,
(CH$_3$)$_2$NCO—CF$_2$—O—CF(CF$_3$)CF$_2$O—CF$_2$CF$_2$—SO$_2$F,
(C$_2$H$_5$)$_2$NCO—CF$_2$—SO$_2$F,
(C$_2$H$_5$)$_2$NCO—CF$_2$CF$_2$—SO$_2$F,
(C$_2$H$_5$)$_2$NCO—CF(CF$_3$)OCF$_2$CF$_2$SO$_2$F,
(C$_2$H$_5$)$_2$NCO—CF$_2$—CF$_2$CF$_2$—SO$_2$F,
(C$_2$H$_5$)$_2$NCO—CF$_2$O—CF(CF$_3$)CF$_2$O—CF$_2$CF$_2$—SO$_2$F
and the like.

Among others, the compound (i) is preferably a compound having the general formula (1), wherein X is —CN, —CONH$_2$, —CON(CH$_3$)$_2$ or —CON(C$_2$H$_5$)$_2$; and
R is —CF$_2$—, —CF$_2$CF$_2$, —CF$_2$O—CF$_2$CF$_2$— or —CF$_2$O—CF(CF$_3$)CF$_2$O—CF$_2$CF$_2$—.

The amount of the compound (i) is preferably 0.01 to 20% by volume relative to the non-aqueous electrolyte. In view of improving durability at high temperature and high voltage, the amount is more preferably 0.02 to 15% by volume, still more preferably 0.05 to 10% by volume.

Because a battery having excellent durability at high temperature and high voltage can be provided, the amount of the non-aqueous solvent (ii) is preferably 0.05% by volume or more and more preferably 0.5% by volume or more relative to the non-aqueous electrolyte.

The non-aqueous solvent (ii) may include a fluorine-containing linear carbonate, a fluorine-containing cyclic carbonate, a fluorine-containing ether, a fluorine-containing ester, a fluorine-containing lactone, a fluoro amide, a non-fluorine-containing ester, a non-fluorine-containing linear carbonate, a non-fluorine-containing cyclic carbonate and the like.

The non-aqueous solvent (ii) preferably contains at least one fluorine solvent selected from the group consisting of a fluorine-containing cyclic carbonate, a fluorine-containing linear carbonate and a fluorine-containing ether. Accordingly a battery including the non-aqueous electrolyte of the present invention can exhibit further excellent durability at high temperature and high voltage.

The non-aqueous solvent (ii) may be the one consisting of a fluorine-containing linear carbonate, a fluorine-containing cyclic carbonate and a fluorine-containing ether; however, provided that the effects of the present invention can be obtained, the non-aqueous solvent (ii) may also contain other non-aqueous solvents such as a fluorine-containing ester, a fluorine-containing lactone, a fluoro amide, a non-fluorine-containing ester, a non-fluorine-containing linear carbonate, a non-fluorine-containing cyclic carbonate, a nitrile, a sulphone and a sulpholane.

(Fluorine-Containing Linear Carbonate)

Addition of the fluorine-containing linear carbonate may improve oxidation resistance.

The fluorine-containing linear carbonate is preferably, for example, a fluorine-containing carbonate represented by the general formula (4):

$$Rf^2OCOORf^3 \quad (4)$$

wherein $Rf^2$ and $Rf^3$ are the same or different and are a $C_{1-4}$ alkyl group, provided that at least one of $Rf^2$ and $Rf^3$ is a fluorine-containing alkyl group, because of high flame retardancy and preferable rate characteristics and oxidation resistance.

$Rf^2$ and $Rf^3$ may be exemplified by, for example, —CH$_3$, —CF$_3$, —CF$_2$CF$_3$, —CH(CF$_3$)$_2$, CF$_3$CH$_2$—, C$_2$F$_5$CH$_2$—, HCF$_2$CF$_2$CH$_2$—, CF$_2$CFHCF$_2$CH$_2$— and the like, among which CF$_3$CH$_2$— or C$_2$F$_5$CH$_2$— is preferable because of high flame retardancy and preferable rate characteristics and oxidation resistance.

The fluorine-containing linear carbonate may be specifically exemplified by a fluorine-containing linear carbonate such as CF$_3$CH$_2$OCOOCH$_2$CF$_3$, CF$_3$CH$_2$OCOOCH$_3$, CF$_3$CF$_2$CH$_2$OCOOCH$_2$CF$_2$CF$_3$, CF$_3$CF$_2$CH$_2$OCOOCH$_3$ and CF$_3$CH$_2$OCOOCH$_3$. Among others, at least one selected from the group consisting of CF$_3$CH$_2$OCOOCH$_2$CF$_3$, CF$_3$CH$_2$OCOOCH$_3$ and CF$_3$CF$_2$CH$_2$OCOOCH$_2$CF$_2$CF$_3$ is particularly preferable because of appropriate viscosity and preferable flame retardancy, compatibility with other solvents and rate characteristics. Compounds disclosed in, for example, Japanese Patent Application Laid-open Nos. H6-21992, 2000-327634 and 2001-256983 may also be mentioned.

The amount of the fluorine-containing linear carbonate is preferably 95% by volume or less relative to the non-aqueous electrolyte. When the amount of the fluorine-containing linear carbonate exceeds 95% by volume, electrolyte salt solubility may tend to be lowered. The amount of the fluorine-containing linear carbonate is more preferably 90% by volume or less, still more preferably 85% by volume or less and particularly preferably 80% by volume or less. The amount is preferably 1% by volume or more, more preferably 2% by volume or more and still more preferably 5% by volume or more.

(Fluorine-Containing Cyclic Carbonate)

Addition of the fluorine-containing cyclic carbonate may increase dielectric constant and improve oxidation resistance and ion conductivity.

The fluorine-containing cyclic carbonate is, for example, preferably the one represented by the following formula (5):

[C1]

(5)

wherein $X^1$ to $X^4$ are the same or different and are —H, —F, —CF$_3$, —CF$_2$H, —CFH$_2$, —(CF$_2$)$_n$CF$_3$ (n=0 to 8), —(CF$_2$)$_n$CF$_3$ (n=0 to 8), —CH$_2$OCH$_2$CF$_2$CF$_3$ or —CH$_2$OCH$_2$CF$_2$CF$_2$H.

At least one of $X^1$ to $X^4$ is the one represented by —F, —CF$_3$, —CF$_2$H, —CFH$_2$, —(CF$_2$)$_n$CF$_3$ (n=0 to 8), —CH$_2$(CF$_2$)$_n$CF$_3$ (n=0 to 8), —CH$_2$OCH$_2$CF$_2$CF$_3$ or —CH$_2$OCH$_2$CF$_2$CF$_2$H.

$X^1$ to $X^4$ are more preferably —H, —F, —CF$_3$, —CF$_2$H, —CFH$_2$, —CF$_2$CF$_3$, —CH$_2$CF$_3$, —CH$_2$CF$_2$CF$_3$ or —CH$_2$OCH$_2$CF$_2$CF$_2$H, and still more preferably, because of preferable dielectric constant and viscosity and excellent compatibility with other solvents, —F, —CF$_3$, —CH$_2$CF$_3$, or —CH$_2$OCH$_2$CF$_2$CF$_2$H.

In the formula (5), in a case of —F, —CF$_3$, —CF$_2$H, —CFH$_2$, —(CF$_2$)$_n$CF$_3$ (n=0 to 8), —CH$_2$(CF$_2$)$_n$CF$_3$ (n=0 to 8), —CH$_2$OCH$_2$CF$_2$CF$_3$ or —CH$_2$OCH$_2$CF$_2$CF$_2$H, then —H, —F, —CF$_3$, —CF$_2$H, —CFH$_2$, —(CF$_2$)$_n$CF$_3$ (n=0 to 8), —CH$_2$(CF$_2$)$_n$CF$_3$ (n=0 to 8), —CH$_2$OCH$_2$CF$_2$CF$_3$ or —CH$_2$OCH$_2$CF$_2$CF$_2$H may be a substituent at only one or more than one position among $X^1$ to $X^4$. Among others, the substituent is at 1 to 2 positions because of preferable dielectric constant and oxidation resistance.

The amount of the fluorine-containing cyclic carbonate is preferably 60% by volume or less relative to the non-aqueous electrolyte. When the amount of the fluorine-containing cyclic carbonate exceeds 60% by volume, the viscosity may be unfavorable, thereby deteriorating rate characteristics. In view of preferable rate characteristics, the amount is more preferably 50% by volume or less and still more preferably 40% by volume or less. In view of preferable oxidation resistance, the amount is preferably 0.2% by volume or more, more preferably 0.5% by volume or more, still more preferably 3% by volume or more and particularly preferably 5% by volume or more.

The fluorine-containing cyclic carbonate is preferably the compounds described hereinbelow because excellent properties such as high dielectric constant and high withstand voltage can be exhibited and the properties of the lithium ion secondary battery of the present invention are improved due to preferable solubility for the electrolyte salt and reduction in internal resistance.

The fluorine-containing cyclic carbonate having high withstand voltage and preferable solubility for the electrolyte salt may include, for example:

[C2]

and the like.

Alternatively, the fluorine-containing cyclic carbonate which may be used may include:

[C3]

and the like.

In view of oxidation resistance, at least one compound selected from the group consisting of a compound represented by the following formula:

[C4]

a compound represented by the following formula (fluoroethylene carbonate: FEC):

[C5]

and
a compound represented by the following formula:

[C6]

is particularly preferred.

(Fluorine-Containing Ether)

Addition of the fluorine-containing ether may improve stability at high temperature and high voltage and safety.

The fluorine-containing ether may be exemplified by, for example, a compound represented by the following formula (6):

$$Rf^4\text{—}O\text{—}Rf^5 \quad (6)$$

wherein $Rf^4$ and $Rf^5$ are the same or different and are a $C_{1\text{-}10}$ alkyl group or a $C_{1\text{-}10}$ fluoroalkyl group, provided that at least one of $Rf^4$ and $Rf^5$ is a fluoroalkyl group.

Specific examples of the fluorine-containing ether may include, for example, $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OCH_3$, $C_8F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$, $HCF_2CF_2OCH_2CH(CH_3)_2$ and the like. At least one selected from the group consisting of $HCF_2CF_2CH_2OCF_2CF_2H$, $CF_3CF_2CH_2OCF_2CF_2H$, $HCF_2CF_2CH_2OCF_2CFHCF_3$ and $CF_3CF_2CH_2OCF_2CFHCF_3$ is particularly preferred because it has high compatibility and provides the electrolyte with low resistance.

The fluorine content of the fluorine-containing ether which may be used for the present invention is preferably 50% by mass or more because of preferable oxidation resistance and safety. The fluorine content is particularly preferably 55 to 66% by mass. The fluorine content is calculated from the structural formula.

The amount of the fluorine-containing ether is preferably 60% by volume or less relative to non-aqueous electrolyte. When the amount of the fluorine-containing ether exceeds 60% by volume, the compatibility may be reduced and rate characteristics may be deteriorated. In view of preferable compatibility and rate characteristics, the amount is more preferably 45% by volume or less and still more preferably 40% by volume or less. In view of preferable oxidation resistance and safety, the amount is preferably 0.5% by volume or more and more preferably 2% by volume or more.

(Fluorine-Containing Ester)

The fluorine-containing ester is preferably a fluorine-containing ester represented by the following formula (7):

$$Rf^6COORf^7 \quad (7)$$

wherein $Rf^6$ is a $C_{1\text{-}2}$ fluorine-containing alkyl group; and $Rf^7$ is a $C_{1\text{-}4}$ fluorine-containing alkyl group, because of high flame retardancy and preferable compatibility with other solvents and oxidation resistance.

$Rf^6$ may be exemplified by, for example, $CF_3$—, $CF_3CF_2$—, $HCF_2CF_2$—, $HCF_2$—, $CH_3CF_2$—, $CF_3CH_2$— and the like, among which $CF_3$— and $CF_3CF_2$— are particularly preferred because of preferable rate characteristics.

$Rf^7$ may be exemplified by, for example, —$CF_3$, —$CF_2CF_3$, —$CH(CF_3)_2$, —$CH_2CF_3$, —$CH_2CH_2CF_3$, —$CH_2CF_2CFHCF_3$, —$CH_2C_2F_5$, —$CH_2CF_2CF_2H$, —$CH_2CH_2C_2F_5$, —$CH_2CF_2CF_3$, —$CH_2CF_2CF_2CF_3$ and the like, among which —$CH_2CF_3$, —$CH(CF_3)_2$—$CH_2C_2F_5$ and —$CH_2CF_2CF_2H$ are particularly preferred because of preferable compatibility with other solvents.

Specific examples of the fluorine-containing ester may include, for example, one or more of $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, $CF_3C(=O)OCH(CF_3)_2$ and the like, among which $CF_3C(=O)OCH_2C_2F_5$, $CF_3C(=O)OCH_2CF_2CF_2H$, $CF_3C(=O)OCH_2CF_3$ and $CF_3C(=O)OCH(CF_3)_2$ are particularly preferred because of preferable compatibility with other solvents and rate characteristics.

Addition of the fluorine-containing ester may improve oxidation resistance.

(Fluorine-Containing Lactone)

The fluorine-containing lactone may include, for example, a fluorine-containing lactone represented by the following formula (8):

[C7]

(8)

wherein $X^5$ to $X^{10}$ are the same or different and are respectively —H, —F, —Cl, —$CH_3$ or a fluorine-containing alkyl group, provided that at least one of $X^5$ to $X^{10}$ is a fluorine-containing alkyl group.

The fluorine-containing alkyl group for $X^5$ to $X^{10}$ may include, for example, —$CFH_2$, —$CF_2H$, —$CF_3$, —$CH_2CF_3$, —$CF_2CF_3$, —$CH_2CF_2CF_3$, —$CF(CF_3)_2$ and the like, and —$CH_2CF_3$ and —$CH_2CF_2CF_3$ are preferred because of high oxidation resistance and an effect for improving safety.

Provided that at least one of $X^5$ to $X^{10}$ is a fluorine-containing alkyl group, —H, —F, —Cl, —$CH_3$ or a fluorine-containing alkyl group may be a substituent at only one or more than one position among $X^5$ to $X^{10}$. The substituent is preferably at 1 to 3 positions and more preferably at 1 to 2 positions in view of preferable solubility for the electrolyte salt.

The position of the substituent fluorine-containing alkyl group is not particularly limited. However, because of preferable synthetic yield, it is preferable that $X^7$ and/or $X^8$, particularly $X^7$ or $X^8$ is a fluorine-containing alkyl group, particularly —$CH_2CF_3$ or —$CH_2CF_2CF_3$. $X^5$ to $X^{10}$ which are not the fluorine-containing alkyl group are —H, —F, —Cl or —$CH_3$, and particularly —H in view of preferable solubility for the electrolyte salt.

The fluorine-containing lactone may also include, in addition to the one represented by the above formula, a fluorine-containing lactone represented by the following formula (9):

[C8]

(9)

wherein one of A and B is $CX^{16}X^{17}$ (wherein $X^{16}$ and $X^{17}$ are the same or different and are respectively —H, —F, —Cl, —CF$_3$, —CH$_3$ or an alkylene group in which a hydrogen atom is optionally substituted by a halogen atom and which optionally contains a hetero atom in the back bone) and the other is an oxygen atom; $Rf^8$ is a fluorine-containing alkyl group optionally containing an ether bond or a fluorine-containing alkoxy group; $X^{11}$ and $X^{12}$ are the same or different and are respectively —H, —F, —Cl, —CF$_3$ or —CH$_3$; $X^{13}$ to $X^{15}$ are the same or different and are respectively —H, —F, —Cl or an alkyl group in which a hydrogen atom is optionally substituted by a halogen atom and which optionally contains a hetero atom in the back bone; and n=0 or 1.

The fluorine-containing lactone represented by the above-mentioned formula (9) may be preferably a five-membered ring structure represented by the following formula (10):

[C9]

(10)

wherein A, B, $Rf^8$, $X^{11}$, $X^{12}$ and $X^{13}$ are the same as those in
the formula (9), in view of ease of synthesis and preferable chemical stability, and may further include, depending on the combination of A and B, a fluorine-containing lactone represented by the following formula (11):

[C10]

(11)

wherein $Rf^8$, $X^{11}$, $X^{12}$, $X^{13}$, $X^{16}$ and $X^{17}$ are the same as those in the formula (9), and a fluorine-containing lactone represented by the following formula (12):

[C11]

(12)

wherein $Rf^8$, $X^{11}$, $X^{12}$, $X^{13}$, $X^{16}$ and $X^{17}$ are the same as those in the formula (9).

Among others:

[C12]

are preferred because excellent properties such as high dielectric constant and high withstand voltage can be exhibited, and properties of the electrolyte of the present invention are improved due to preferable solubility for the electrolyte salt and reduction in internal resistance.

Alternatively:

[C13]

and the like may also be used.

Addition of the fluorine-containing lactone may improve ion conductivity, safety and stability at high temperature.

(Fluoro Amide)

The fluoro amide is a compound represented by the formula:

[C14]

$Rf^9$ is —CF$_3$, —CF$_2$CF$_3$, a fluorophenyl group or a fluoroalkylphenyl group. The fluorophenyl group preferably has 1 to 5 fluorine atoms and the one having, in particular, 3 to 5 fluorine atoms is more preferable in view of preferable oxidation resistance. The fluoroalkyl group in the fluoro- alkylphenyl group may include, for example, —CF₃, —C₂F₅, —HC(CF₃)₂ and the like, among which —CF₃ and —C₂F₅ are preferred in view of preferable compatibility and decreased viscosity.

$R^5$ and $R^6$ are the same or different and are respectively a $C_{1-8}$ alkyl group. —CH₃, —C₂H₅, —C₃H₇, —C₄H₉ and the like may be specifically mentioned, among which —CH₃ and —C₂H₅ are preferred in view of decreased viscosity.

Particularly preferable fluoro amide includes the following compounds.

[C15]

The non-aqueous electrolyte of the present invention may contain the fluoro amide at 10% by volume or less. When the amount of the fluoro amide exceeds 10% by volume, the viscosity may be increased and the ion conductivity may be decreased. Because of preferable stability at high temperature and high voltage even with a decreased viscosity, the amount is preferably 6% by volume or less, and because of further preferable stability at high temperature and high voltage, the amount is still more preferably 3% by volume or less. A preferable lower limit is, in view of stability at high temperature and high voltage, 0.01% by volume and more preferably 0.05% by volume.

(Fluorine-Free Ester)

The fluorine-free ester may improve rate characteristics. The fluorine-free ester is preferably an acetic ester, a propionic ester, a butyric ester and the like. The amount thereof is preferably 30% by volume or less and still more preferably 20% by volume or less in order to secure compatibility with the electrolyte salt. The lower limit of the amount is 1% by volume and more preferably 3% by volume because of an improvement in rate characteristics.

(Fluorine-Free Cyclic Carbonate)

Among fluorine-free cyclic carbonates, ethylene carbonate (EC), vinylene carbonate (VC) and propylene carbonate (PC) are preferable for the electrolyte of the present invention because of high dielectric constant and particularly excellent solubility for the electrolyte salt. When the negative electrode contains a graphite material, the carbonates mentioned above allow formation of a stable film on the negative electrode. Alternatively, butylene carbonate, vinyl ethylene carbonate and the like may also be used. Among others, at least one selected from the group consisting of ethylene carbonate, vinylene carbonate, propylene carbonate and butylene carbonate is particularly preferable in view of dielectric constant and viscosity. The amount thereof is preferably 0 to 50% by volume and more preferably 0 to 40% by volume.

(Fluorine-Free Linear Carbonate)

The fluorine-free linear carbonate may include, for example, one or more of hydrocarbon linear carbonates such as $CH_3CH_2OCOOCH_2CH_3$ (diethyl carbonate: DEC), $CH_3CH_2OCOOCH_3$ (ethyl methyl carbonate: EMC), $CH_3OCOOCH_3$ (dimethyl carbonate: DMC) and $CH_3OCOOCH_2CH_2CH_3$ (methyl propyl carbonate). Among these, at least one selected from the group consisting of DEC, EMC and DMC is preferred because of high boiling point, low viscosity and preferable properties at low temperature. The amount thereof is preferably 0 to 85% by volume and more preferably 0 to 80% by volume.

Addition of the fluorine-free linear carbonate may improve properties at low temperature and load characteristics due to decreased viscosity.

(Nitrile)

The nitrile is preferably a mononitrile such as acetonitrile, propionitrile and phenylnitrile or a dinitrile such as succinonitrile and glutaronitrile.

(Sulphone, Sulpholane)

Sulphones and derivatives thereof and sulpholanes and derivatives thereof may be mentioned.

The non-aqueous electrolyte of the present invention contains an electrolyte salt (iii). The electrolyte salt (iii) may be any electrolyte salts, among which a lithium salt is preferred. The lithium salt may include, for example, inorganic lithium salts such as $LiClO_4$, $LiPF_6$ and $LiBF_4$; and fluorine-containing organic acid lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, lithium difluoro(oxalato)borate [LiFOB], lithium bis(oxalato)borate [LiBOB], a salt represented by the formula: $LiPF_a(C_nF_{2n+1})_{6-a}$ (wherein a is an integer of 0 to 5 and n is an integer of 1 to 6), which may be used alone or in combination of two or more. Among these, $LiPF_6$, $LiBF_4$, $LiCF_3SO_3$, $LiN(CF_3SO_2)_2$, $LiN(C_2F_5SO_2)_2$, lithium difluoro(oxalato)borate, lithium bis(oxalato)borate or a salt represented by the formula: $LiPF_a(C_nF_{2n+1})_{6-a}$ (wherein a is an integer of 0 to 5 and n is an integer of 1 to 6), particularly $LiPF_6$ or $LiBF_4$ is preferred. A combination of an inorganic lithium salt such as $LiPF_6$ or $LiBF_4$ and a fluorine-containing organic lithium salt such as $LiCF_3SO_3$, $LiN(CF_3SO_2)_2$ or $LiN(C_2F_5SO_2)_2$ is more preferable because of decreased deterioration after storage at high temperature.

The salt represented by the formula: $LiPF_a(C_nF_{2n+1})_{6-a}$ may include $LiPF_3(CF_3)_3$, $LiPF_3(C_2F_5)_3$, $LiPF_3(C_3F_7)_3$, $LiPF_3(C_4F_9)_3$, $LiPF_4(CF_3)_2$, $LiPF_4(C_2F_5)_2$, $LiPF_4(C_3F_7)_2$, $LiPF_4(C_4F_9)_2$ (wherein the alkyl groups represented by $C_3F_7$ and $C_4F_9$ may be linear or branched) and the like.

The electrolyte salt (iii) is more preferably, among others, a lithium salt selected from the group consisting of $LiBF_4$, $LiPF_6$, $LiCF_3SO_3$, $LiN(CF_3SO_2)_2$, $LiN(C_2F_5SO_2)_2$, lithium difluoro(oxalato)borate, lithium bis(oxalato)borate and a salt represented by the formula: $LiPF_a(C_nF_{2n+1})_{6-a}$ (wherein a is an integer of 0 to 5 and n is an integer of 1 to 6).

The concentration of the electrolyte salt (iii) in the non-aqueous electrolyte is preferably 0.5 to 3 mol/liter. When the concentration is outside of this range, the electrical conductivity of the electrolyte is lowered, whereby battery performances may be reduced.

The non-aqueous electrolyte may contain, within the range that does not impair the effects of the present invention, other additives such as a nonflammability imparting agent (flame retardant), a surfactant, a high dielectric effect imparting agent, a cycle characteristics and rate characteristics improving agent and an overcharge preventing agent.

The nonflammability imparting agent (flame retardant) which may be added in order to improve nonflammability and flame retardancy may include a phosphate ester. The phosphate ester may include fluorine-containing alkyl phosphate esters, fluorine-free alkyl phosphate esters, aryl phosphate esters and the like, among which fluorine-containing alkyl phosphate esters are preferred because they can highly contribute to nonflammability of the electrolyte and can exhibit nonflammability effect at a low amount.

The fluorine-containing alkyl phosphate esters may include fluorine-containing dialkyl phosphate esters disclosed in Japanese Patent Application Laid-open No. H11-233141, cyclic alkyl phosphate esters disclosed in Japanese Patent Application Laid-open No. H11-283669 as well as fluorine-containing trialkyl phosphate esters.

In order to improve flame retardancy, a flame retardant such as $(CH_3O)_3P=O$ and $(CF_3CH_2O)_3P=O$ may also be added.

The surfactant may be added in order to improve capacitance characteristics and rate characteristics.

The surfactant may be any of cationic surfactants, anionic surfactants, nonionic surfactants and amphoteric surfactants. However, a fluorine-containing surfactant is preferred because of preferable cycle characteristics and rate characteristics.

A fluorine-containing carboxylic salt represented by the following formula (13):

$$Rf^{10}COO^-M^+ \quad (13)$$

wherein $Rf^{10}$ is a $C_{3\text{-}10}$ fluorine-containing alkyl group optionally containing an ether bond; and $M^+$ is $Li^+$, $Na^+$, $K^+$ or $NHR'_3{}^+$ (wherein a plurality of R' is the same or different and is respectively H or a $C_{1\text{-}3}$ alkyl group), and a fluorine-containing sulphonic salt represented by the following formula (14):

$$Rf^{11}SO_3^-M^+ \quad (14)$$

wherein $Rf^{11}$ is a $C_{3\text{-}10}$ fluorine-containing alkyl group optionally containing an ether bond; and $M^+$ is $Li^+$, $Na^+$, $K^+$ or $NHR'_3{}^+$ (wherein a plurality of R' is the same or different and is respectively H or a $C_{1\text{-}3}$ alkyl group) may be preferably exemplified.

The amount of the surfactant is preferably 0.01 to 2% by mass of the non-aqueous electrolyte in view of reduction in surface tension of the electrolyte without deteriorating charge-discharge cycle characteristics.

The high dielectric effect imparting agent may be exemplified by, for example, sulpholane, methyl sulpholane, γ-butyrolactone, γ-valerolactone, acetonitrile, propionitrile and the like.

The cycle characteristics and rate characteristics improving agent may be exemplified by methyl acetate, ethyl acetate, tetrahydrofuran, 1,4-dioxane and the like.

The overcharge preventing agent may include aromatic compounds such as cyclohexylbenzene, biphenyl, alkylbiphenyl, terphenyl, partial hydrogenation products of terphenyl, t-butylbenzene, t-amylbenzene, diphenyl ether, benzofuran, dibenzofuran, hexafluorobenzene, fluorobenzene, dichloroaniline and toluene; partial fluorination products of the aromatic compounds such as 2-fluorobiphenyl; and fluorine-containing anisole compounds such as 2,4-difluoroanisole, 2,5-difluoroanisole and 2,6-difluoroanisole. Addition of the overcharge preventing agent at 0.1 to 5% by weight to the non-aqueous electrolyte may suppress burst and ignition of the battery upon overcharge and the like.

The battery of the present invention includes a positive electrode, a negative electrode and the non-aqueous electrolyte.

A positive electrode active material used for the positive electrode is preferably at least one selected from the group consisting of cobalt composite oxides, nickel composite oxides, manganese composite oxides, iron composite oxides and vanadium composite oxides because these oxides have high energy density and can provide a secondary battery with high output. The cobalt composite oxides, nickel composite oxides, manganese composite oxides, iron composite oxides and vanadium composite oxides may include the following compounds.

The battery of the present invention preferably has a charging voltage of 3.0 to 5.0 V. The battery of the present invention has excellent durability at high voltage, and thus may be used at higher voltage and may have a charging voltage at 3.5 to 5.0 V, for example.

The battery of the present invention preferably includes the positive electrode containing, as a positive electrode active material, a lithium transition metal oxide represented by the following formula (2-1):

$$\text{Li}_a\text{M}^1_{2-(a+b)}\text{M}^2_b\text{O}_2 \quad (2\text{-}1)$$

wherein $M^1$ is Mn, Ni, V, Co, or Fe; $M^2$ is at least one selected from the group consisting of Fe, Co, Ni, Mn, Mg, Cu, Zn, Al, Sn, B, Ga, Cr, V, Sr, Ca, In, Si, Ge and Ti; provided that $0.4 \leq a \leq 1.2$ and $0 \leq b \leq 0.6$ and $M^1$ and $M^2$ are different, or a lithium transition metal oxide represented by the following formula (2-2):

$$\text{Li}_c\text{M}^3_{2-d}\text{M}^4_d\text{O}_4 \quad (2\text{-}2)$$

wherein $M^3$ is Mn, Ni, V, Co, Al or Fe; $M^4$ is at least one selected from the group consisting of Fe, Co, Ni, Mn, Mg, Cu, Zn, Al, Sn, B, Ga, Cr, V, Sr, Ca, In, Si, Ge and Ti; provided that $0.9 \leq c$ and $0 \leq d \leq 1.5$ and $M^3$ and $M^4$ are different, because high charging voltage can be obtained.

The positive electrode preferably contains, because a lithium secondary battery with high energy density and high output can be provided, at least one compound selected from the group consisting of $LiCoO_2$, $LiMnO_2$, $LiNiO_2$, $LiMn_2O_4$, $LiNi_{0.5}Mn_{1.5}O_4$, $LiNi_{0.8}Co_{0.15}Al_{0.05}O_2$, $LiNi_{1/3}Co_{1/3}Mn_{1/3}O_2$, $LiNi_{0.8}Co_{0.2}O_2$, $Li_{1.2}Fe_{0.4}Mn_{0.4}O_2$ and $LiNi_{0.5}Mn_{0.5}O_2$ as a positive electrode active material. The positive electrode more preferably contains at least one compound selected from the group consisting of $LiMnO_2$, $LiNiO_2$, $LiMn_2O_4$, $LiNi_{0.5}Mn_{1.5}O_4$, $LiNi_{0.8}Co_{0.15}Al_{0.05}O_2$ and $LiNi_{1/3}Co_{1/3}Mn_{1/3}O_2$ as a positive electrode active material.

In view of increasing the charging voltage, $M^1$ is preferably Ni, Mn, or Co and more preferably Ni or Mn.

$M^2$ is preferably at least one selected from the group consisting of Fe, Co and Al.

$M^3$ is preferably Fe, Co or Al and more preferably Fe or Co.

$M^4$ is preferably at least one selected from the group consisting of Ni and Mn.

The battery of the present invention preferably has a charging voltage of 4.30 V or more. When a positive electrode is used which contains $LiCoO_2$ as a positive electrode active material for example, the charging voltage is generally up to about 4.20 V, and when a positive electrode active material is used to which voltage of about 4.20 V is applied, conventional non-aqueous electrolytes can provide such an effect that durability at high temperature and high voltage is improved.

On the other hand, when a positive electrode active material is a lithium transition metal oxide containing Mn, Ni, V or Fe, the positive electrode active material can be used at higher voltage, although when the positive electrode active material is used, sufficient improvement in durability at high temperature and high voltage could not be provided.

When the positive electrode containing the lithium transition metal oxide as a positive electrode active material is used with the non-aqueous electrolyte containing the compound (i), the battery of the present invention has particularly excellent durability at high temperature and high voltage. The battery of the present invention preferably has a charging voltage of 4.35 V or more.

In view of cycle life enhancement, a preferable embodiment of the battery of the present invention includes the positive electrode containing, as the positive electrode active material, a lithium transition metal phosphate compound represented by the following formula (3):

$$\text{Li}_e\text{M}^5_{1-f}\text{M}^6_f\text{PO}_4 \quad (3)$$

wherein $M^5$ is Fe, V, Ni, Co or Mn; $M^6$ is at least one selected from the group consisting of Fe, Co, Ni, Mn, Mg, Cu, Zn, Al, Sn, B, Ga, Cr, V, Sr, Ca, In, Si, Ge and Ti; provided that $0.9 \leq e \leq 1.2$ and $0 \leq f \leq 0.3$ and $M^5$ and $M^6$ are different.

When the positive electrode is used which contains the lithium transition metal phosphate compound, which includes Mn, Ni, V or Fe, as the positive electrode active material, conventional non-aqueous electrolytes could not sufficiently improve durability at high temperature and high voltage. However, by using the non-aqueous electrolyte containing the compound (i) the battery of the present invention has, even when the positive electrode is used which contains the lithium transition metal phosphate compound as the positive electrode active material, particularly excellent durability at high temperature and high voltage.

It is also preferable that when the positive electrode contains the lithium transition metal phosphate compound represented by the formula (3) as the positive electrode active material, the battery of the present invention has a charging voltage of 3.5 V or more. When the lithium transition metal phosphate compound such as $LiFePO_4$ is used as the positive electrode active material, the charging voltage is generally 3.1 to 3.3 V. However, the battery of the present invention exhibits excellent durability even when it is used at voltage as high as 3.5 V or more.

In view of cycle life enhancement, $M^5$ is preferably Fe, V or Co and more preferably Fe or V.

$M^6$ is at least one selected from the group consisting of Fe, Ni and Mn.

Moreover, the positive electrode is preferably at least one compound selected from the group consisting of $LiFePO_4$, $LiCoPO_4$, $LiVPO_4$, $LiMnPO_4$, $LiCoPO_4$, $LiNiPO_4$ and modified products thereof because both properties at high voltage and safety can be achieved. Among others, in view of safety and cycle characteristics, at least one compound selected from the group consisting of $LiFePO_4$, $LiVPO_4$, $LiMnPO_4$, $LiNiO_4$ and $LiCoPO_4$ is more preferred.

The positive electrode active material may be exemplified by $LiV_3O_6$, $Li_2MnO_3$ and the like.

The amount of the positive electrode active material is preferably 50 to 99% by mass and more preferably 80 to 99% by mass of the positive electrode mixture in view of high battery capacity.

When the present invention is used for large lithium ion secondary batteries for hybrid vehicles and dispersed power sources, high output is required. Therefore it is preferable that particles of the positive electrode active material mainly contain secondary particles and that the secondary particles have an average particle diameter of 40 μm or less and contain 0.5 to 7.0% by volume of fine particles having an average primary particle diameter of 1 μm or less. Inclusion of fine particles having an average primary particle diameter of 1 μm or less allows an increase in the contact area of the particles with the electrolyte and facilitates diffusion of lithium ions between the electrode and the electrolyte, thereby resulting in an improvement in output performances.

A binding agent for the positive electrode may be any material as far as it is safe against solvents used for preparation of the electrode and against the electrolyte. For example, polyvinylidene fluoride, polytetrafluoroethylene, polyethylene, polypropylene, styrene-butadiene rubber, isoprene rubber, butadiene rubber, ethylene-acrylic acid copolymers and ethylene-methacrylic acid copolymers and the like may be mentioned.

A thickening agent for the positive electrode may include carboxymethylcellulose, methylcellulose, hydroxymethylcellulose, ethylcellulose, polyvinyl alcohol, oxidized starch, phosphated starch, casein and the like.

A current collector for the positive electrode may be formed with a material including a metal such as aluminium, titanium or tantalum and an alloy thereof, among which aluminium or an alloy thereof is preferred.

A conductive material may include carbon materials such as graphite, carbon black and the like.

The solvent may include N-methyl-2-pyrrolidone, methyl isobutyl ketone, xylene and the like, among which N-methyl-2-pyrrolidone is preferred.

The material for the negative electrode in the lithium ion secondary battery may be carbon materials capable of absorbing and storing and releasing lithium such as thermolysis products of organic substances under various thermolysis conditions, synthetic graphite and natural graphite; metal oxide materials capable of absorbing and storing and releasing lithium such as tin oxide and silicon oxide; lithium metal; various lithium alloys and the like. Two or more negative electrode materials among these may be mixed and used.

The carbon material capable of absorbing and storing and releasing lithium is preferably synthetic graphite produced by processing graphitizing pitch derived from various starting materials at high temperature or purified natural graphite of products obtained by subjecting the above graphite to surface treatment with pitch or other organic substances prior to carbonization.

The negative electrode may be produced according to a conventional method. For example, a method may be mentioned in which the negative electrode material is added with a binder, a thickening agent, a conductive material, a solvent and the like to obtain slurry which is then applied on the current collector before drying and pressing for compacting.

The negative electrode binding agent may be any material as far as it is safe against solvents used for preparation of the electrode and against the electrolyte. For example, polyvinylidene fluoride, polytetrafluoroethylene, polyethylene, polypropylene, styrene-butadiene rubber, isoprene rubber, butadiene rubber, ethylene-acrylic acid copolymers and ethylene-methacrylic acid copolymers and the like may be mentioned.

The negative electrode thickening agent may include carboxymethylcellulose, methylcellulose, hydroxymethylcellulose, ethylcellulose, polyvinyl alcohol, oxidized starch, phosphated starch, casein and the like.

The conductive material may include metal materials such as copper and nickel; carbon materials such as graphite and carbon black.

A current collector for the negative electrode may be formed with a material including copper, nickel or stainless, among which a copper foil is preferable in view of processability thereof to a thin film and the cost.

The battery of the present invention preferably further contains a separator. The separator for the battery of the present invention may be any in the material and shape thereof as far as it is stable in the electrolyte and can sufficiently retain liquid. Among others, the separator is preferably a porous sheet made from polyolefins such as polyethylene and polypropylene or a non-woven cloth.

The shape of the battery of the present invention is not limited and may be, for example, in the form of a cylinder, rectangular, coin and the like, or may be a laminated type or may be a large battery. The shape and configuration of the positive electrode, the negative electrode and the separator can be modified according to the shape of the battery.

The battery of the present invention is particularly useful as an electrolyte for large lithium ion secondary batteries for hybrid vehicles and dispersed power sources. Alternatively, it is also useful as a non-aqueous electrolyte for small lithium ion secondary batteries.

EXAMPLES

The present invention is further specifically illustrated by way of Examples and Comparative Examples. However the present invention is not limited only to these Examples.

Examples 1 to 43 and Comparative Examples 1 to 12

(Preparation of Battery)

The following four positive electrode active materials were used to prepare electrodes: Lithium iron phosphate ($LiFePO_4$: hereinafter also referred to as "LFP");
$LiNi_{1/3}Mn_{1/3}Co_{1/3}O_2$ (the molar ratio of Ni, Mn and Co is 1:1:1) (hereinafter also referred to as "NCM");
Spinel manganese ($LiMn_2O_4$: hereinafter also referred to as "LMO"); and
Nickel manganese ($LiNi_{0.5}Mn_{0.5}O_2$: hereinafter also referred to as "NiMn").

Synthetic graphite was used as the negative electrode active material to prepare the electrode.

The positive electrode active materials used for preparation of the electrodes were LFP for Examples 1 to 13 and Comparative Examples 1 to 3, NCM for Examples 14 to 26 and Comparative Examples 4 to 6, LMO for Examples 27 to 39 and Comparative Examples 7 to 9 and NiMn for Examples 40 to 43 and Comparative Examples 10 to 12.

(Preparation of Electrolyte)

The following components were used for preparation of electrolytes. The components A to E and other components were mixed at the volume ratio indicated in the following Tables 1 to 4 to prepare non-aqueous solvents for electrolyte salt dissolution.

Component A:
A1: $NH_2-(CO)-CF_2-SO_2F$
A2: $(C_2H_5)_2N-CF_2-O-CF_2CF_2-SO_2F$
A3: $CN-CF_2O-CF_2CF_2SO_2F$
A4: $CN-CF_2-O-CF(CF_3)CF_2OCF_2CF_2-SO_2F$
Component B: Cyclic Carbonate
B1: EC
B2: PC
B3: VC
B4: FEC
B5: $CF_3CH_2$-EC
B6: $HCF_2CF_2CH_2OCH_2$-EC
Component C: Linear Carbonate
C1: DMC
C2: EMC
C3: DEC
C4: $CF_3CH_2OCOOCH_3$
C5: $CF_3CH_2OCOOCH_2CF_3$
Component D: Fluoroether
D1: $CF_3CF_2CH_2OCF_2CFHCF_3$
D2: $HCF_2CF_2CH_2OCF_2CF_2H$
Component E: Electrolyte Salt
E1: $LiPF_6$
E2: $LiBF_4$
E3: $LiN(CF_3SO_2)_2$
E4: LiBOB
Component F: Other Components
PS: propane sultone
SN: succinonitrile (Preparation of Laminated Cell)

The positive electrode active material obtained by mixing each positive electrode active material, carbon black and polyvinylidene fluoride (Kureha Corporation; trade name: KF-1000) at 92/3/5 (ratio in % by mass) was dispersed in N-methyl-2-pyrrolidone to obtain slurry. The slurry was uniformly applied on a positive electrode current collector (an aluminium foil with a thickness of 15 μm) and dried to form a positive electrode mixture layer. The resulting product was compression-moulded on a roller press and cut prior to welding a lead wire to prepare a strip-shaped positive electrode.

Meanwhile to synthetic graphite powder (Hitachi Chemical Co., Ltd; trade name: MAG-D) was added styrene-butadiene rubber dispersed in distilled water so as to obtain the solid content of 6% by mass, and mixed in a disperser to obtain slurry. The slurry was uniformly applied on a negative electrode current collector (a copper foil with a thickness of 10 μm) and dried to form a negative electrode mixture layer. The resulting product was compression-moulded on a roller press and cut and dried prior to welding a lead wire to prepare a strip-shaped negative electrode.

Figure 1:
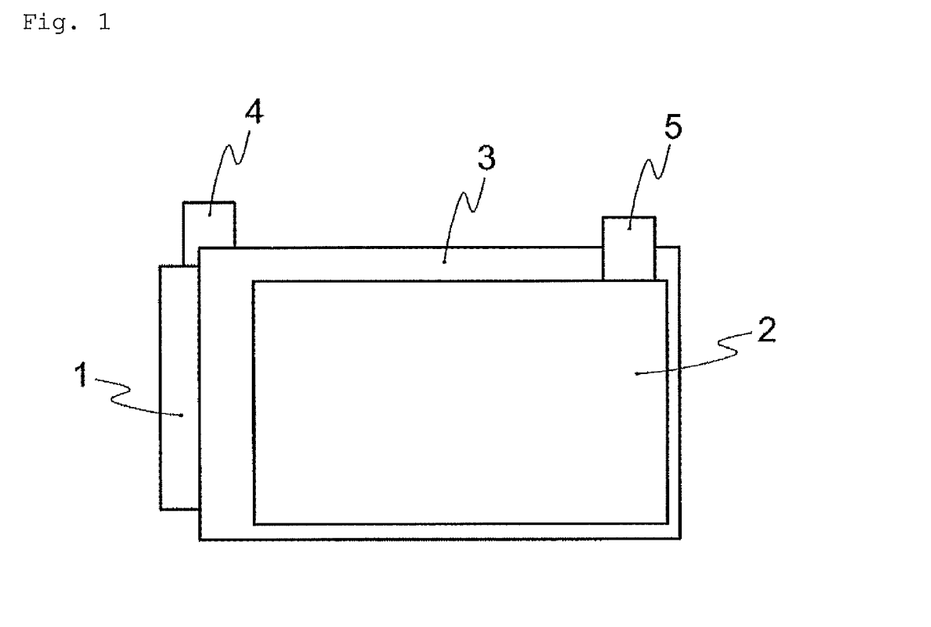
FIG. 1 is a schematic perspective diagram of assembly of a laminated cell prepared for the battery property test in Examples and Comparative Examples.
Figure 2:
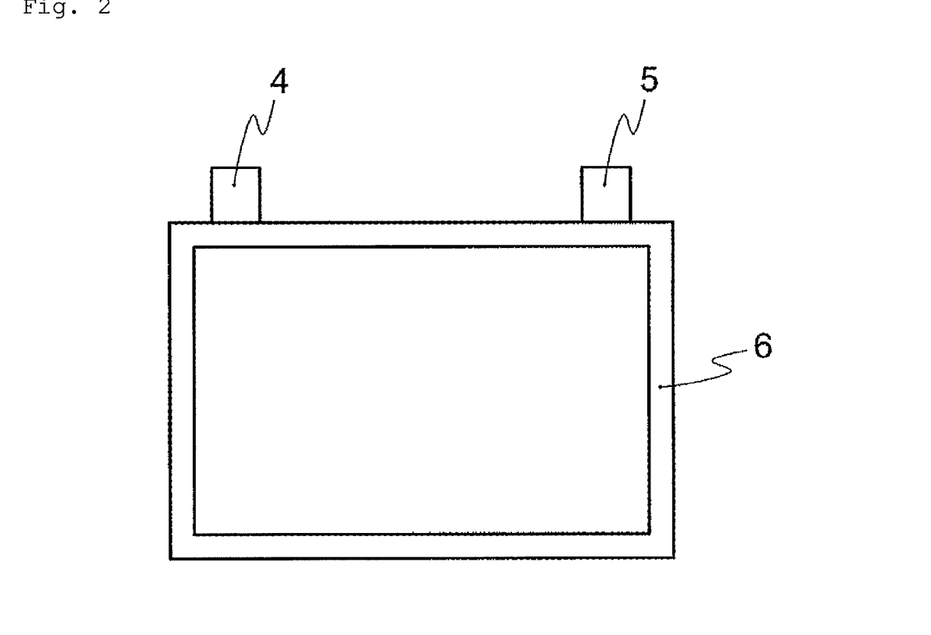
FIG. 2 is a schematic plan diagram of a laminated cell prepared for the battery property test in Examples and Comparative Examples.

As shown in the schematic perspective assembly diagram of FIG. 1, the strip-shaped positive electrode 1 was cut into 40 mm×72 mm (with a positive electrode terminal 4 of 10 mm×10 mm) and the strip-shaped negative electrode 2 was cut into 42 mm×74 mm (with a negative electrode terminal 5 of 10 mm×10 mm) and lead wires were connected to the terminals by welding. A separator 3 obtained by cutting a fine porous polyethylene film having a thickness of 20 μm into the dimension of 78 mm×46 mm was arranged between the positive electrode and the negative electrode. They were placed in, as shown in FIG. 2, an aluminium laminated packaging material 6 to which 2 ml of electrolyte was then placed. The packaging material 6 was sealed to prepare a laminated cell having a capacity of about 80 mAh.

(Cycle Characteristics)

The obtained laminated cells were subjected to charge-discharge cycles in which the cells were charged at 1.0 C up to predetermined voltage depending on the positive electrode active material until the charging current of 1/10 C was obtained, discharged with current of 0.2 C up to 2.5 V and subsequently charged at 1.0 C up to predetermined voltage depending on the positive electrode active material until the charging current of 1/10 C was obtained. The temperature was maintained at 60° C.

Discharge capacity after 5 cycles and discharge capacity after 100 cycles with 1 cycle corresponding to one charge and one discharge were measured and the capacity maintenance ratio (%) was calculated as the proportion of the discharge capacity after 100 cycles relative to the discharge capacity after 5 cycles.

The capacity maintenance ratio was calculated, with the initial discharge capacity being 100%, by measuring the residual capacity after charge and subsequent storage at 85° C. for 5 hrs. The cells were subsequently subjected to one more cycle at room temperature and measured for discharge capacity to calculate the recovery rate.

The laminated cells prepared as above were subjected to measurements of cycle characteristics and measurements of capacity maintenance ratio/recovery rate under the following conditions.

The charging voltage was 3.6 V when lithium iron phosphate (LFP) was used in the positive electrode;

the charging voltage was 4.35 V when NCM was used in the positive electrode;

the charging voltage was 4.2 V when spinel manganese (LMO) was used in the positive electrode; and the charging voltage was 4.95 V when nickel manganese (NiMn) was used in the positive electrode.

The discharging voltage was 2.5 V in the test.

The results are shown in Tables 1 to 4.

TABLE 1

| | LFP/synthetic graphite 3.6-V system | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| A1 | 2 | 2 | 2 | | | | | 2 | 1 | |
| A2 | | | | 2 | | | | | 2 | |
| A3 | | | | | 2 | | | | | 2 |
| A4 | | | | | | 2 | | | | |
| B1 | 30 | 30 | 30 | 30 | 30 | 30 | 30 | 30 | 30 | 30 |
| B2 | | | | | | | | | | |
| B3 | | | 2 | | | | | | | |
| B4 | | | | | | | | | | |
| B5 | | | | | | | 2 | 2 | 1 | 1 | 1 | 1 |
| B6 | | | | 2 | | | | | | |

TABLE 1-continued

LFP/synthetic graphite 3.6-V system

|  |  |  |  |  |  |  |  |  |  |  |
|---|---|---|---|---|---|---|---|---|---|---|
| C1 |  |  |  |  |  |  |  |  |  |  |
| C2 | 68 | 64 | 66 | 64 | 64 | 61 | 62 | 62 | 62 | 62 |
| C3 |  |  |  |  |  |  |  |  |  |  |
| C4 |  |  |  |  |  |  |  |  |  |  |
| C5 |  |  |  |  |  |  |  |  |  |  |
| D1 |  |  |  |  |  |  |  |  |  |  |
| D2 |  |  |  | 2 | 2 | 2 | 5 | 5 | 5 | 5 |
| E1 | 1M | 1M | 1M | 1M | 1M | 1M | 1M | 1M | 1M | 1M |
| E2 |  |  |  |  |  |  |  |  |  |  |
| E3 |  |  |  |  |  |  |  |  |  |  |
| E4 |  |  |  |  |  |  |  |  |  |  |
| $CH_3SO_2F$ |  |  |  |  |  |  |  |  |  |  |
| $CH_3Ph$—$SO_2F$ |  |  |  |  |  |  |  |  |  |  |
| Cycle characteristics | 93 | 91 | 94 | 94 | 95 | 95 | 96 | 96 | 93 | 94 |
| Maintenance ratio (%) | 86 | 85 | 89 | 90 | 92 | 90 | 91 | 90 | 91 | 90 |
| Recovery rate (%) | 84 | 87 | 92 | 92 | 93 | 92 | 93 | 92 | 92 | 91 |

|  | Example 11 | Example 12 | Example 13 | Comparative Example 1 | Comparative Example 2 | Comparative Example 3 |
|---|---|---|---|---|---|---|
| A1 |  | 2 | 2 |  |  |  |
| A2 |  |  |  |  |  |  |
| A3 |  |  |  |  |  |  |
| A4 | 2 |  |  |  |  |  |
| B1 | 30 | 30 | 30 | 30 | 30 | 30 |
| B2 |  |  |  |  |  |  |
| B3 |  |  | 2 |  |  |  |
| B4 |  | 2 |  |  |  |  |
| B5 | 1 |  |  |  |  |  |
| B6 |  |  |  |  |  |  |
| C1 |  |  |  |  |  |  |
| C2 | 62 | 62 | 62 | 70 | 68 | 68 |
| C3 |  |  |  |  |  |  |
| C4 |  |  |  |  |  |  |
| C5 |  |  |  |  |  |  |
| D1 |  |  |  |  |  |  |
| D2 | 5 | 5 | 5 |  |  |  |
| E1 | 1M | 1M | 1M | 1M | 1M | 1M |
| E2 |  |  |  |  |  |  |
| E3 |  |  |  |  |  |  |
| E4 |  |  |  |  |  |  |
| $CH_3SO_2F$ |  |  |  |  | 2 |  |
| $CH_3Ph$—$SO_2F$ |  |  |  |  |  | 2 |
| Cycle characteristics | 92 | 88 | 85 | 82 | 84 | 76 |
| Maintenance ratio (%) | 88 | 86 | 80 | 71 | 73 | 68 |
| Recovery rate (%) | 91 | 87 | 84 | 74 | 77 | 72 |

TABLE 2

NCM/synthetic graphite 4.35-V system

|  | Example 14 | Example 15 | Example 16 | Example 17 | Example 18 | Example 19 | Example 20 | Example 21 | Example 22 | Example 23 |
|---|---|---|---|---|---|---|---|---|---|---|
| A1 | 2 | 2 | 2 | 2 | 2 | 2 | 2 | 1 |  |  |
| A2 |  |  |  |  |  |  |  |  | 2 |  |
| A3 |  |  |  |  |  |  |  |  |  | 2 |
| A4 |  |  |  |  |  |  |  |  |  |  |
| B1 | 30 | 30 | 30 | 30 | 30 | 30 | 30 | 30 | 20 | 30 |
| B2 |  |  |  |  |  |  |  |  |  |  |
| B3 |  | 2 |  |  |  | 1 | 2 |  |  |  |
| B4 |  |  |  |  |  | 1 |  | 4 |  |  |
| B5 |  |  |  |  | 2 |  |  |  | 1 | 1 |
| B6 |  |  |  | 2 |  |  |  |  |  |  |
| C1 |  |  |  |  |  |  | 15 |  | 15 |  |
| C2 | 68 | 66 | 63 | 61 | 61 | 56 | 33 | 50 | 42 | 62 |
| C3 |  |  |  |  |  |  |  |  |  |  |
| C4 |  |  |  |  |  |  |  |  |  |  |
| C5 |  |  |  |  |  |  |  |  |  |  |
| D1 |  |  |  |  |  |  |  |  |  |  |
| D2 |  |  | 5 | 5 | 5 | 10 | 20 | 15 | 20 | 5 |

TABLE 2-continued

NCM/synthetic graphite 4.35-V system

|  |  |  |  |  |  |  |  |  |  |  |
|---|---|---|---|---|---|---|---|---|---|---|
| E1 | 1M | 1M | 1M | 1M | 1M | 1M | 1M | 1M | 1M | 1M |
| E2 |  |  |  |  |  |  |  |  |  |  |
| E3 |  |  |  |  |  |  |  |  |  |  |
| E4 |  |  |  |  |  |  |  |  |  |  |
| PS |  |  |  |  |  |  |  |  |  |  |
| SN |  |  |  |  |  |  |  |  |  |  |
| $CH_3SO_2F$ |  |  |  |  |  |  |  |  |  |  |
| $CH_3Ph—SO_2F$ |  |  |  |  |  |  |  |  |  |  |
| Cycle characteristics | 83 | 83 | 89 | 89 | 91 | 92 | 91 | 93 | 93 | 90 |
| Maintenance ratio (%) | 80 | 78 | 85 | 85 | 85 | 86 | 86 | 89 | 91 | 86 |
| Recovery rate (%) | 83 | 80 | 87 | 86 | 87 | 87 | 88 | 91 | 92 | 88 |

|  | Example 24 | Example 25 | Example 26 | Comparative Example 4 | Comparative Example 5 | Comparative Example 6 |
|---|---|---|---|---|---|---|
| A1 |  | 2 | 2 |  |  |  |
| A2 |  |  |  |  |  |  |
| A3 |  |  |  |  |  |  |
| A4 | 2 |  |  |  |  |  |
| B1 | 30 | 30 | 30 | 30 | 30 | 30 |
| B2 |  |  |  |  |  |  |
| B3 |  |  | 2 |  |  |  |
| B4 |  | 2 |  |  |  |  |
| B5 | 1 |  |  |  |  |  |
| B6 |  |  |  |  |  |  |
| C1 |  |  |  |  |  |  |
| C2 | 55 | 59 | 61 | 70 | 68 | 68 |
| C3 |  |  |  |  |  |  |
| C4 |  |  |  |  |  |  |
| C5 |  |  |  |  |  |  |
| D1 |  |  |  |  |  |  |
| D2 | 10 | 4.9 | 4.9 |  |  |  |
| E1 | 1M | 1M | 1M | 1M | 1M | 1M |
| E2 |  |  |  |  |  |  |
| E3 |  |  |  |  |  |  |
| E4 |  |  |  |  |  |  |
| PS | 2 | 2 |  |  |  |  |
| SN |  | 0.1 | 0.1 |  |  |  |
| $CH_3SO_2F$ |  |  |  |  | 2 |  |
| $CH_3Ph—SO_2F$ |  |  |  |  |  | 2 |
| Cycle characteristics | 91 | 85 | 86 | 73 | 75 | 70 |
| Maintenance ratio (%) | 88 | 81 | 83 | 68 | 69 | 64 |
| Recovery rate (%) | 91 | 83 | 84 | 71 | 72 | 68 |

TABLE 3

LMO/synthetic graphite 4.2-V system

|  | Example 27 | Example 28 | Example 29 | Example 30 | Example 31 | Example 32 | Example 33 | Example 34 | Example 35 | Example 36 |
|---|---|---|---|---|---|---|---|---|---|---|
| A1 | 2 | 2 | 2 | 2 | 2 | 2 | 2 | 1 |  |  |
| A2 |  |  |  |  |  |  |  |  | 2 |  |
| A3 |  |  |  |  |  |  |  |  |  | 2 |
| A4 |  |  |  |  |  |  |  |  |  |  |
| B1 | 30 | 30 | 30 | 30 | 30 | 30 | 30 | 30 | 30 | 30 |
| B2 |  |  |  |  |  |  |  | 5 |  |  |
| B3 |  | 2 |  |  |  | 1 | 2 |  |  |  |
| B4 |  |  |  |  |  | 1 |  | 4 |  |  |
| B5 |  |  |  |  | 2 |  |  |  | 1 | 1 |
| B6 |  |  |  | 2 |  |  |  |  |  |  |
| C1 |  |  | 15 | 15 |  |  |  |  |  |  |
| C2 | 68 | 66 | 48 | 31 | 46 | 56 | 51 | 55 | 62 | 62 |
| C3 |  |  |  | 15 | 15 |  |  |  |  |  |
| C4 |  |  |  |  |  | 5 |  |  |  |  |
| C5 |  |  |  |  |  |  | 5 |  |  |  |
| D1 |  |  |  |  |  |  |  |  |  | 5 |
| D2 |  |  | 5 | 5 | 5 | 5 | 10 | 5 | 5 |  |
| E1 | 1M | 1M | 1M | 1M | 1M | 1M | 1M | 1M | 1M | 0.8M |
| E2 |  |  |  |  |  |  |  |  |  | 0.2M |
| E3 |  |  |  |  |  |  |  |  |  |  |
| E4 |  |  |  |  |  |  |  |  |  |  |
| $CH_3SO_2F$ |  |  |  |  |  |  |  |  |  |  |
| $CH_3Ph—SO_2F$ |  |  |  |  |  |  |  |  |  |  |

TABLE 3-continued

| LMO/synthetic graphite 4.2-V system | | | | | | | | | |
|---|---|---|---|---|---|---|---|---|---|
| Cycle characteristics | 88 | 85 | 86 | 89 | 90 | 92 | 91 | 89 | 92 | 93 |
| Maintenance ratio (%) | 83 | 82 | 82 | 85 | 85 | 86 | 85 | 82 | 88 | 86 |
| Recovery rate (%) | 84 | 84 | 83 | 87 | 87 | 87 | 88 | 87 | 90 | 89 |

| | Example 37 | Example 38 | Example 39 | Comparative Example 7 | Comparative Example 8 | Comparative Example 9 |
|---|---|---|---|---|---|---|
| A1 | | 2 | 2 | | | |
| A2 | | | | | | |
| A3 | | | | | | |
| A4 | 2 | | | | | |
| B1 | 30 | 30 | 30 | 30 | 30 | 30 |
| B2 | | | | | | |
| B3 | | | 2 | | | |
| B4 | | 2 | | | | |
| B5 | 1 | | | | | |
| B6 | | | | | | |
| C1 | | | | | | |
| C2 | 57 | 56 | 61 | 70 | 68 | 68 |
| C3 | | | | | | |
| C4 | | | | | | |
| C5 | | | | | | |
| D1 | | | | | | |
| D2 | 10 | 10 | 5 | | | |
| E1 | 0.8M | 0.8M | 1M | 1M | 1M | 1M |
| E2 | | | | | | |
| E3 | 0.2M | | | | | |
| E4 | | 0.2M | | | | |
| $CH_3SO_2F$ | | | | | 2 | |
| $CH_3Ph-SO_2F$ | | | | | | 2 |
| Cycle characteristics | 93 | 89 | 91 | 77 | 75 | 71 |
| Maintenance ratio (%) | 89 | 84 | 86 | 72 | 69 | 64 |
| Recovery rate (%) | 91 | 87 | 88 | 74 | 73 | 68 |

TABLE 4

| NiMn/synthetic graphite 4.95-V system | | | | | | | |
|---|---|---|---|---|---|---|---|
| | Example 40 | Example 41 | Example 42 | Example 43 | Comparative Example 10 | Comparative Example 11 | Comparative Example 12 |
| A1 | 2 | 2 | 2 | 2 | | | |
| A2 | | | | | | | |
| A3 | | | | | | | |
| A4 | | | | | | | |
| B1 | | | | | 30 | 30 | 30 |
| B2 | | | | | | | |
| B3 | | | | | | | |
| B4 | 20 | 10 | 10 | 20 | | | |
| B5 | 10 | 10 | 10 | 10 | | | |
| B6 | | 2 | | | | | |
| C1 | | | | | | | |
| C2 | | 28 | 38 | 70 | 68 | 68 | |
| C3 | | | | | | | |
| C4 | 63 | 53 | 30 | | | | |
| C5 | | 13 | | | | | |
| D1 | | | | | | | |
| D2 | 5 | 10 | 20 | 30 | | | |
| E1 | 1M | 1M | 1M | 1M | 1M | 1M | 1M |
| E2 | | | | | | | |
| E3 | | | | | | | |
| E4 | | | | | | | |
| $CH_3SO_2F$ | | | | | | 2 | |
| $CH_3Ph-SO_2F$ | | | | | | | 2 |
| Cycle characteristics | 76 | 78 | 80 | 82 | 35 | 32 | 28 |
| Maintenance ratio (%) | 72 | 72 | 73 | 78 | 20 | 23 | 20 |
| Recovery rate (%) | 77 | 78 | 78 | 82 | 28 | 30 | 30 |

In Tables 1 to 4, the unit for the values indicated in the columns of A1, A2, A3, A4, B1, B2, B3, B4, B5, B6, C1, C2, C3, C4, C5, D1, D2, PS, SN, $CH_3SO_2F$ and $CH_3Ph$-$SO_2F$ is "% by volume".

INDUSTRIAL APPLICABILITY

The non-aqueous solvent of the present invention can be suitably used as batteries in the area where durability at high temperature and high voltage is required such as electric vehicles and hybrid electric vehicles.

REFERENCE SIGNS LIST

1 Positive electrode
2 Negative electrode
3 Separator
4 Positive electrode terminal
5 Negative electrode terminal
6 Aluminium laminated packaging material

The invention claimed is:

1. A non-aqueous electrolyte comprising:
   (i) a compound represented by the general formula (1):

$$X\text{—}R\text{—}SO_2F \quad (1)$$

(where R is a $C_{1-12}$ linear or branched alkylene group optionally containing an ether bond and optionally hydrogen atoms of the alkylene group are partly substituted by a fluorine atom(s); and X is a carboxylic acid derivative group);
   (ii) a non-aqueous solvent; and
   (iii) an electrolyte salt;
   wherein X is —$CONH_2$, —CN, —$CON(CH_3)_2$ or —$CON(C_2H_5)_2$, and
   wherein the non-aqueous electrolyte contains the compound (i) at 0.01 to 20% by volume.

2. The non-aqueous electrolyte according to claim 1, wherein the non-aqueous solvent (ii) is at least one fluorine solvent selected from the group consisting of a fluorine-containing cyclic carbonate, a fluorine-containing linear carbonate and a fluorine-containing ether.

3. The non-aqueous electrolyte according to claim 1, wherein R is a fluorine-containing alkylene group optionally containing an ether bond.

4. The non-aqueous electrolyte according to claim 1, wherein R is a perfluoroalkylene group optionally containing an ether bond.

5. A battery comprising a positive electrode, a negative electrode and the non-aqueous electrolyte according to claim 1.

6. The battery according to claim 5, wherein
   the positive electrode contains, as a positive electrode active material, a lithium transition metal oxide represented by the following formula (2-1):

$$Li_aM^1{}_{2-(a+b)}M^2{}_bO_2 \quad (2\text{-}1)$$

(where $M^1$ is Mn, Ni, V, Co, or Fe; $M^2$ is at least one selected from the group consisting of Fe, Co, Ni, Mn, Mg, Cu, Zn, Al, Sn, B, Ga, Cr, V, Sr, Ca, In, Si, Ge and Ti; provided that $0.4 \leq a \leq 1.2$ and $0 \leq b \leq 0.6$, and $M^1$ and $M^2$ are different).

7. The battery according to claim 6, having a charging voltage of 4.30 V to 5.0 V.

* * * * *